(No Model.)
R. R. GUBBINS.
PNEUMATIC TIRE.
No. 510,019. Patented Dec. 5, 1893.
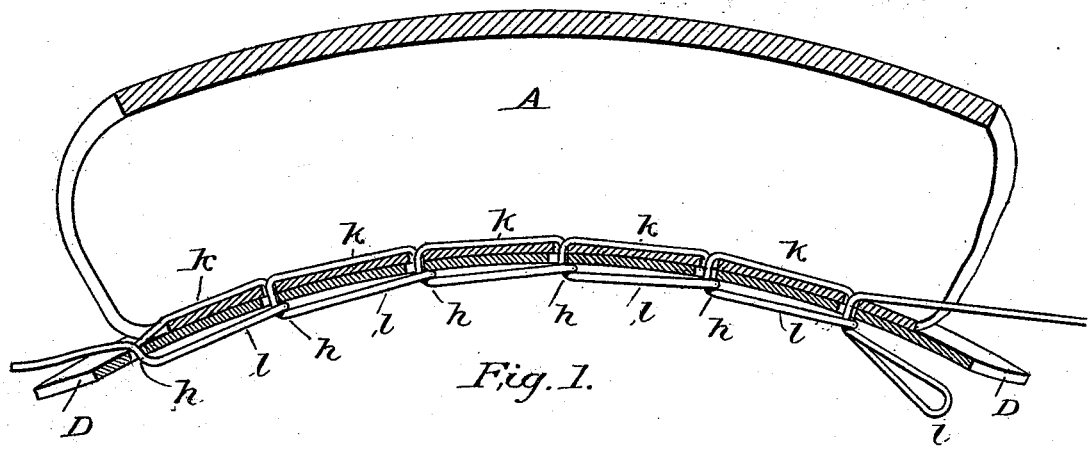
Fig. 1.
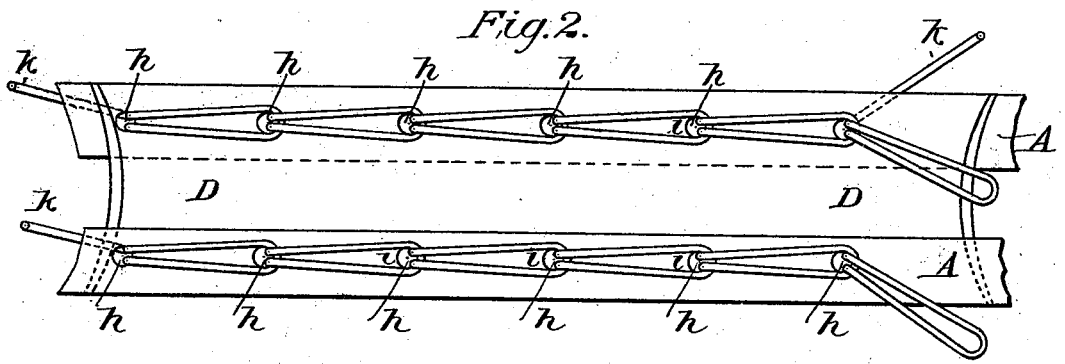
Fig. 2.
Fig. 4. Fig. 5. Fig. 3.
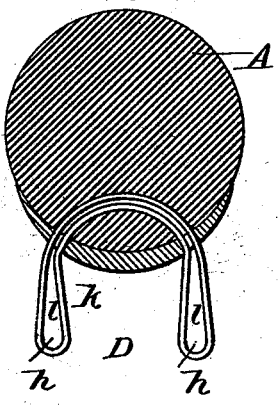 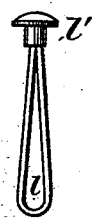 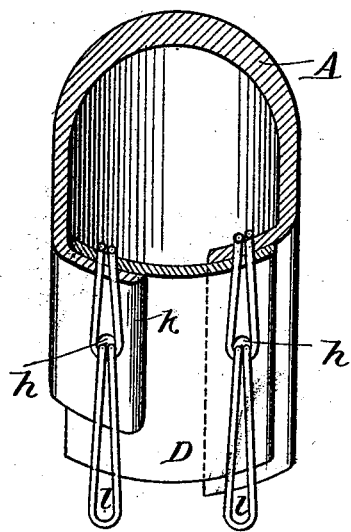
Witnesses:
J. P. Bayly,
F. F. Edwards.
Inventor:
Richard Russell Gubbins.
THE NATIONAL LITHOGRAPHING COMPANY,
WASHINGTON, D. C.

UNITED STATES PATENT OFFICE.

RICHARD RUSSELL GUBBINS, OF BELVEDERE, ENGLAND.

PNEUMATIC TIRE.

SPECIFICATION forming part of Letters Patent No. 510,019, dated December 5, 1893.

Application filed November 19, 1892. Serial No. 452,602. (No model.) Patented in England November 25, 1892, No. 21,547.

*To all whom it may concern:*

Be it known that I, RICHARD RUSSELL GUBBINS, a subject of the Queen of Great Britain, residing at Belvedere, in the county of Kent, England, have invented new and useful Improvements in Pneumatic Tires, (for which I have received English Patent No. 21,547, dated November 25, 1892,) of which the following is a specification.

My invention relates to improvements in pneumatic tires for bicycles and other vehicles and the object of my improvement is to provide a simple and cheap mode of removing the outer cover from the wheel rim, in the case of the Dunlop kind of tire and for fastening on the solid sort of tires without resort to cement or the like.

I attain my object by the means shown in the accompanying drawings, in which—

Figure 1, is a longitudinal section of a pneumatic tire, showing the cover fastened in my improved manner to a wheel rim. Fig. 2, is a plan of the same, looking from the center of the wheel, and shows the cover fastened both outside and inside the wheel rim. Fig. 3, is a transverse section of Fig. 2. Fig. 4, shows a solid india rubber tire secured on a wheel rim, and Fig. 5, is an elevation and plan of my flexible cotter.

Similar letters refer to similar parts throughout the several views.

In carrying out my invention (when the tire is to be secured inside the rim, as in the upper half of Fig. 2) I first drill a row of holes, $h$, in each edge of the rim, D, and then fasten rows of flexible loops, $l$, on the tire or cover, A, which correspond with the holes, $h$, when the tire, A, is in position on the wheel rim, D. The flexible loops, $l$, are then passed through the holes, $h$, and are locked over each other as shown in Figs. 1 and 2. The final loop is made fast upon a hook $h'$ set in the rim, or upon a button. When the cover is to be fastened outside the rim, D, as shown in the lower half of Fig. 2, the loops, $l$, are fast to the rim, D, and the holes, $h$, are made in the edges of the cover, A. The working is the same as in the other case, as shown in the drawings.

For convenience of gaining access to the "inner tube" of "detachable" tires, I provide a number of hooks $h'$ at suitable distances apart, to which the adjoining loops are secured. This allows the cover to be unfastened in the neighborhood of a puncture only. In the case of solid tires, or of "single tube pneumatics," the loops are locked one over the other, all round the wheel, to the place of beginning, and the last loop may then be tied down or caught over a hook or button, provided for that purpose at the starting point before described. This fastening will be found to be more secure and rigid than cement for a solid tire or for a "single tube pneumatic." It is also lighter, as the material that comes out of the holes in the rim, will weigh as much as, and consequently make up for, the weight of the flexible loops. For "detachable" tire covers its advantages are manifold and apparent. There can be no "creeping" or "rolling," as longitudinal and lateral movements of the tire are called by bicyclists. The extra weight is *nil*, as the loops are balanced by drilling the rim. The cover can be readily undone and fastened, at any point, or all the way round, as may be desired.

Having now described my invention, I claim as new and desire to secure by Letters Patent—

1. In a vehicle wheel with a flexible tire, securing the tire to the rim by flexible loops on the tire, passing through holes in the rim and locking over one another or over a hook as shown at $h'$ in the manner above described and for the purpose set forth.

2. In a vehicle wheel with a flexible tire, securing the tire to the rim by flexible loops on the rim passing through holes in the edge of the tire cover, and locking over one another, or over a hook as shown at $h'$ in the manner above described and for the purpose set forth.

3. In a pneumatic tire the combination of the cover, A, and loops, $l$, in the manner above described and for the purpose set forth.

RICHARD RUSSELL GUBBINS.

Witnesses:
    ALEX CEIRIT RIDGWAY,
19 *Change Alley, London, Law Student.*
    FREDK. J. NAYLOR,
140 *Leadenhall St. and* 19 *Change Alley, London, E. C., Notary Public.*